Nov. 24, 1953     H. G. BECK     2,659,941
REFRIGERATOR GASKET

Filed Dec. 17, 1949

INVENTOR
*Howard G. Beck*
BY *Evans & McCoy*
ATTORNEYS

Patented Nov. 24, 1953

2,659,941

UNITED STATES PATENT OFFICE 2,659,941

REFRIGERATOR GASKET

Howard G. Beck, Wabash, Ind., assignor to The General Tire and Rubber Company, Akron, Ohio, a corporation of Ohio Application December 17, 1949, Serial No. 133,653

7 Claims. (Cl. 20—35)

This invention relates to a rubber seal or gasket for use as a closure unit in connection with rubber mountings for joining adjacent panel edges, and in particular this invention relates to a mounting and seal in combination for use on refrigerator doors and the like.

Adjacent panel edges are often joined together by a linear rubber mounting having opposed channels or grooves for receiving the panel edges and means by which to expand the mounting body and cause it to grip and hold the panel edges firmly in the channels. In some cases, an additional closure unit or sealing means is required to seal the panel thus formed against a third surface. Examples of this are refrigerator doors and the tops and lids of insulated chests and boxes.

In refrigerators, insulated chests, and the like, it is desirable to provide a break between the continuity of the inside of the door or lid and the outside surface so that heat is not conducted through the door frame or panels from the surrounding atmosphere into the cooling unit. When the inner and outer panel edges are separated by a rubber mounting, just such an insulative break is achieved. Until the present time, however, no satisfactory means has been found by which to install a seal or gasket in conjunction with a rubber mounting without using many screws or items which require much time during the assembly of the refrigerator component.

Much of the difficulty lies with the structure of the seals or gaskets. By far the most satisfactory seals are the type with a central hollow portion. This hollow forms a dead air space around the door or panel in which it is installed and insulates the interior of the unit from the surrounding atmosphere. At the same time, it gives the seal or gasket a compressible and resilient structure which allows a large width of gasket to flatten against the surface with which it engages and thus it insures an adequate seal. The principal disadvantage with a hollow gasket, however, is that it cannot be bent or shaped around corners and the like without causing it to crimp and to collapse upon itself. To prevent this crimping and collapsing, the corners and bends in the form of the seal required by the various sized doors and panels to which it has to fit have been made and spliced in after extrusion and then set and cured or vulcanized. This, of course, requires that each gasket be custom built for its particular door or panel and that a large number of gaskets be made. Furthermore, this necessitates considerable added expense in manufacturing the gaskets and causes complications in the assembling of them.

One object of this invention is to develop a hollow seal or gasket for use on refrigerator doors which is inexpensively manufactured and easily assembled and bent to the desired contour without crimping.

Another object is to provide a linear seal that may be satisfactorily used both as a means for rapidly securing the variously shaped components of refrigerator doors together without bolts, screws, and the like and as a gasket between the door and cabinet.

Another object is to minimize expense and complication in the assembly of structures such as refrigerator doors requiring both a linear rubber mounting member for joining edges of door components together and also a linear rubber closure seal to seal the air space between peripheral portions of the door and cabinet.

Other objects and advantages will become apparent upon examination of the accompanying drawings in which like parts are denoted by like numerals.

Figure 1:
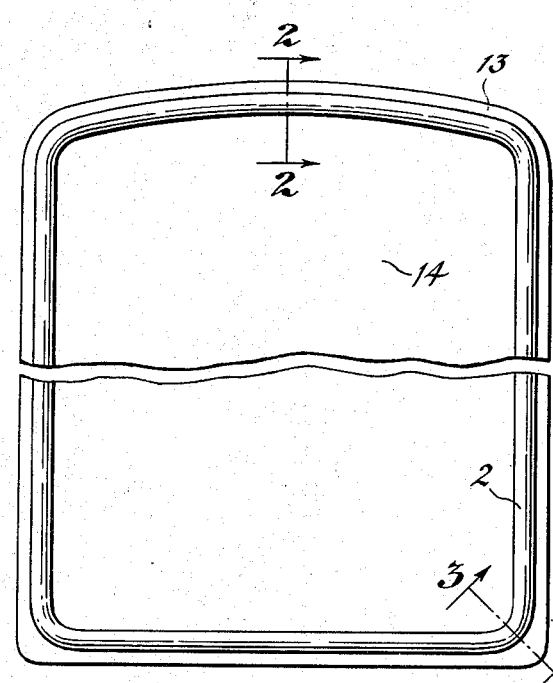
Figure 1 is a front elevation of the inside of a refrigerator door showing the gasket or mounting of this invention as assembled with the door frame and central panel.

This invention comprises a novelly formed gasket of rubber or rubberlike material. From Figs. 2 and 4, it can be seen that the gasket is composed of a mounting portion 1 joining the edges of adjacent panels and a sealing portion 2 integral with the mounting portion 1. The mounting portion surprisingly controls the operation of the sealing portion for it is found that the aforementioned crimping and collapsing of the sealing portion is avoided when the seal is made integral with a resilient mounting of more massive and thicker sections. The massive mounting body stiffens and braces the seal and greatly reduces or eliminates the tendency for it to collapse when formed and bent.

The mounting portion 1 is characterized by a linear body with opposing grooves or channels 3 and 4 into which the panel edges fit. The flanges or groove-forming portions of the mounting body 5 and 6 together with the connecting portion 7 define the left hand groove or channel 3 and the flanges 8 and 9 together with the connecting portion 7 define the right hand groove 4. The grooves are generally oppositely disposed to each other or back to each other and act in the same planes or planes parallel to each other. That is, the grooves are roughly aligned with the plane passing through the mid-points at the innermost portion of each groove. The inner surface of each flange is preferably inwardly curved or concave to enable the flanges to grip and hold the panel edges throughout the width thereof. This eliminates any tendency for the gripping force of the flange to act only at the base or root of the groove.

Intermediate the grooves 3 and 4 and outward, and generally to one side of their median plane is a longitudinal opening or channel 10. The walls of this hollow are shaped to receive a plug or spreader element 11 and the hollow preferably has an inner V-shaped extension 12 to provide increased flexibility.

Figures 3, 4:
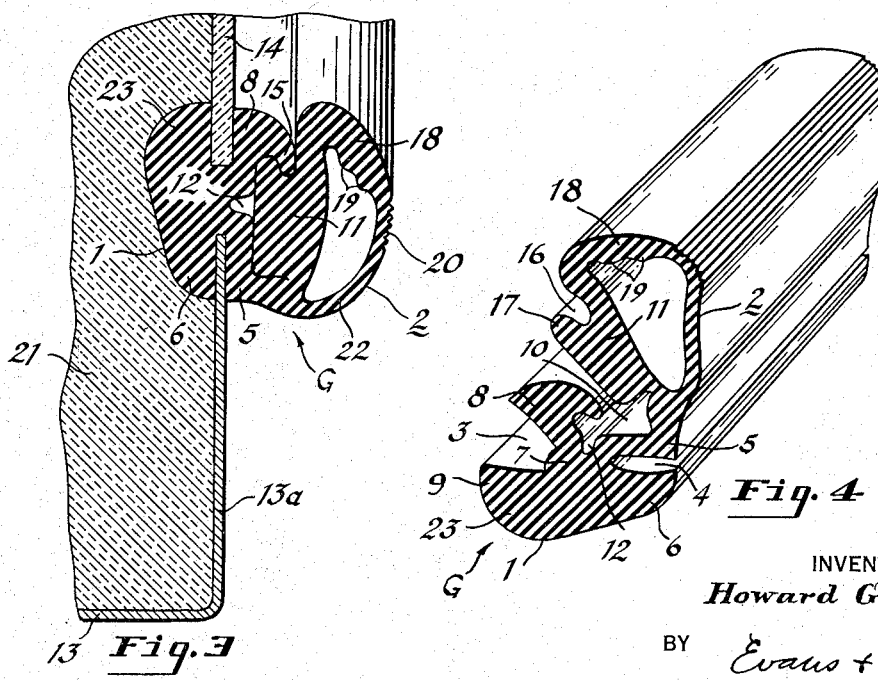
Fig. 3 is an enlarged cross-sectional view taken along line 3—3 in Fig. 1 showing the mounting as assembled and its cross-sectional shape, particularly the seal portion, at the corner bends.
Fig. 4 is a perspective of the mounting in the unlocked or unassembled position. This shows the relation and position of the various parts prior to assembly.

When the mounting is in the open or unlocked position as shown in Fig. 4, the upper or top flanges 5 and 8 on the sealing portion side of the median plane are fully flexible to and from each other and can be bent to open the channels 3 and 4 for easy reception of the panel edges. These flanges 5 and 8 are bendable toward each other relatively easily because there is no intervening mass or body of material or, in other words, the channel 10 is located between them. At the same time, the flanges 6 and 9 on the opposite side of the median plane are relatively stiff and immovable because the mounting portion between them is solid.

For assembly, the panel edges or in this case the edge of the refrigerator door frame 13 and the central panel 14 are inserted in grooves 3 and 4 respectively and the plug or spreader element 11 is forced into the channel 10 to expand the mounting and force the flanges 5 and 8 into tight-gripping engagement with the panel edges. For this purpose the plug 11 should be of sufficient mass and thickness to be stable against transverse bending or folding, and proportioned or shaped to fill the channel or hollow 10. In this invention the plug 11 is integral with and hinged to the mounting portion along one wall or edge of the channel 10. Along the mounting portion forming the other side or wall of the channel 10 is an overhanging lip or bead 15. The plug element has a corresponding groove or recession 16 and bead 17 which fits underneath the lip 15 to hold and lock the plug in position.

A major feature of the present invention is the integral gasket or sealing portion 2 which is incorporated with the mounting and plug 11. This sealing portion or hollow bead 2 is formed integrally with and extruded as a part of the mounting and consequently is composed of the same rubber as the mounting. The general shape of the seal is arcuate or preferably ovate with a relatively flatter outer portion or top. The seal outline shape will naturally vary with the thickness of the side walls 22 of the seal and with the installation in which it is to be used.

Figure 2:
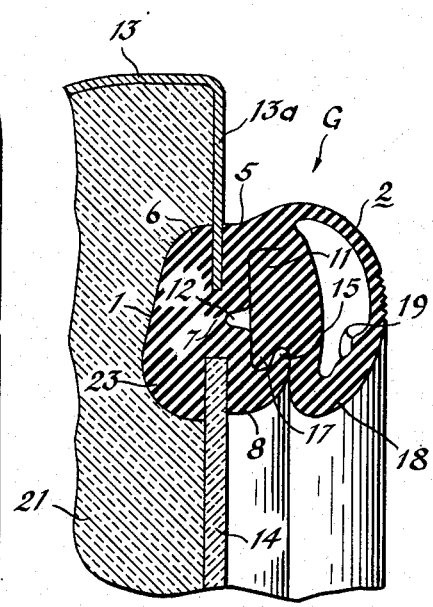
Fig. 2 is an enlarged cross-sectional view taken along line 2—2 in Fig. 1 and showing the mounting as assembled with the refrigerator door frame and inside or central panel.

An important feature of the seal shown in the drawing is the thickened portion 18 in the side wall 22 of the seal and the ribs 19 along the interior of the seal wall along the same side. This thicker portion 18 and ribs 19, together with a thickened portion 23 of the mounting or flange 9 are, it may be noted, disposed on one side of a longitudinal plane that is generally vertical or generally perpendicular to the plane through the midpoints of the grooves 3 and 4 in the closed seal as used in an assembled refrigerator door. They thus combine to throw the center of gravity and therefore the bending radius of the sealing section inwardly to assist in obtaining a uniform shape in the straight and curved portions of the gasket. In other words, this thickened wall section and the wall ribs add mass to the sealing portion to eliminate or greatly reduce crimping and collapsing of the gasket when bent. In order to so function, this thicker seal wall must be kept along the inner side of any bend. The force required for compression of the thickened portions before linking is sufficient to cause elongation of the thinner portion during bending. Fig. 2 shows a cross-section taken at a straight portion of the gasket as assembled and Fig. 3 shows a cross-section taken through a bend or corner. In Fig. 3 the thicker portion 18 is toward the inner side or central panel 14. If desired, slight corrugations 20 may be molded or formed in the sealing portion to give more complete line contacts with the refrigerator body frame (not shown).

As shown in Fig. 1, the gasket or mounting G of which only the sealing portion 2 shows, joins without other fastening or mounting means the edge of refrigerator door frame 13 with the edge of the inside panel 14 in a continuous length around the inside panel. This provides a complete heat break between the outside or door frame 13 and the interior or inside panel 14 and consequently very little heat can be readily conducted through the frame directly into the refrigerator. Any heat so entering must pass through the gasket which is of rubber or rubber-like material and thus insulative or relatively nonconductive of heat.

The sealing portion 2 flattens against the refrigerator body frame and excludes air and insulates against heat along the juncture of the door frame and body frame. In this way a complete heat seal is furnished in the gasket combination of the present invention.

The door frame 13 is preferably made of sheet steel or other metal with an enameled or vitreous finish and an outward curving or convex front face and side flanges 13a bent back into a U shape so that there is an inturned open edge substantially about the entire peripheral portion of the door frame. These inturned flanges 13a are generally parallel to the plane of the front of the refrigerator body when the door is closed. The central or inside panel 14 is preferably flat fiberboard or other nonheat-conductive material and fits into the opening in the inner face of the door frame to cooperate with the door frame and integral outer door portion (not shown) to completely enclose the insulation 21. The edges on both the door frame and panel do not have to be finished edges but do have to correspond roughly, taking into account the distance between opposing grooves of the mounting portion of the gasket.

The mountings and seals shown in this description are intended primarily for use on refrigerators, cabinets, and frozen food units, but they are equally serviceable under any conditions in which adjacent panel edges need to be joined and a seal or closure against a third panel surface is required. In other words, only preferred embodiments of the invention have been illustrated and described. Other embodiments may be made within the invention as provided by the patent statutes.

What I claim is:

1. The combination of (1) a mounting portion for joining panel edges which mounting portion comprises a linear body of rubberlike material of uniform cross sections with opposing grooves therein to receive panel edges, a longitudinal opening intermediate the grooves and generally to one side of a longitudinal plane passing through the middle of the base portion of said grooves and a plug element hingedly connected to said body along one edge adjacent said longitudinal opening and proportioned for insertion into said opening to thereby expand the body of the mounting into tight gripping engagement with the panel edges and (2) a hollow, bulbous seal integral with said plug element and extending outwardly from the mounting body on the same side of the plane through the midpoints of the opposing grooves as that of the plug element.

2. The combination of (1) a mounting portion for joining panel edges which mounting portion comprises a linear body of rubberlike material of uniform cross section with opposing grooves therein to receive panel edges, a longitudinal opening intermediate the grooves and generally to one side of a longitudinal plane passing through the middle of the base portion of said grooves and a plug element hingedly connected to said body along one edge adjacent said longitudinal opening and proportioned for insertion into said opening to thereby expand the body of the mounting into tight gripping engagement with the panel edges and (2) a hollow ovate seal integral with said mounting portion which has one side wall thickened along the lower portion thereof.

3. The combination of (1) a mounting portion for joining panel edges which mounting portion comprises a linear body of rubberlike material of uniform cross sections with opposing grooves therein to receive panel edges, a longitudinal opening intermediate the grooves and generally to one side of a longitudinal plane passing through the middle of the base portion of said grooves and a plug element hingedly connected to said body along one edge adjacent said longitudinal opening and proportioned for insertion into said opening to thereby expand the body of the mounting into tight gripping engagement with the panel edges and (2) a hollow ovate seal integral with said mounting portion which has one side wall thickened along the lower portion thereof, said mounting portion being proportioned to place the center of mass thereof closer to one of said opposing grooves than to the other, the center mass of said ovate seal and of said mounting being on the same side of a longitudinal plane which is perpendicular to said first mentioned plane and is so disposed that the line of intersection between said planes is equidistant the outer edges of said grooves when the mounting is in the closed position.

4. A mounting and hollow seal according to claim 3 further characterized in that the portions of both the mounting and of the seal are thicker on one side of the longitudinal plane that is generally perpendicular to a plane through the walls of the opposing grooves furthest from said longitudinal hollow whereby the center of mass of said mounting and seal, while said plug element is in said opening, is on one side of said longitudinal plane and bending without kinking is obtainable.

5. A gasket for joining panel edges which comprises a linear body of rubberlike material of uniform cross sections with opposing grooves therein to receive panel edges, a longitudinal opening intermediate the grooves and generally to one side of a longitudinal plane passing through the middle of the base portion of said grooves and a plug element hingedly connected to said body along one outer wall edge of said longitudinal opening and proportioned for insertion into said opening to thereby expand the body of the gasket into tight gripping engagement with the panel edges and a hollow ovate seal which has one side wall thicker and more massive than the other side wall toward and at the juncture of said seal wall with said plug element.

6. The combination of (1) a mounting portion for joining panel edges which mounting portion comprises a linear body of rubberlike material of uniform cross-section with opposing grooves therein to receive panel edges, a longitudinal opening intermediate the grooves and generally to one side of a longitudinal plane passing through the middle of the base portion of said grooves and a plug element hingedly connected to said body and proportioned for insertion into said opening to thereby expand the body of the mounting into tight gripping engagement with the panel edges and (2) a hollow ovate seal integral with said mounting portion which has one side wall thickened along the lower portion thereof and which has longitudinal ribs along the interior surface of said thickened side wall, at least one of the two side walls of one of said opposing grooves being thicker than the corresponding side wall of the other of said grooves of said mounting portion to place the center of mass of said body portion substantially closer to one of said grooves than to the other.

7. The combination of claim 6 wherein the centers of mass of said mounting portion and of said hollow ovate seal are on the same side of a longitudinal plane which is perpendicular to said first mentioned longitudinal plane and which is equally spaced from the outer edges of each of said grooves.

HOWARD G. BECK.

References Cited in the file of this patent

UNITED STATES PATENTS

| Number | Name | Date |
|---|---|---|
| 2,189,138 | Eichner | Feb. 6, 1940 |
| 2,215,889 | Swedman | Sept. 24, 1940 |
| 2,234,847 | Swedman | Mar. 11, 1941 |
| 2,265,693 | Knight | Dec. 9, 1941 |
| 2,288,329 | Smith | June 30, 1942 |
| 2,350,430 | Ulrich | June 6, 1944 |
| 2,379,193 | Shields | June 26, 1945 |
| 2,466,935 | Doty | Apr. 12, 1949 |
| 2,492,566 | Geyer | Dec. 27, 1949 |
| 2,607,966 | Beck | Aug. 26, 1952 |